Patented June 13, 1939

2,162,311

UNITED STATES PATENT OFFICE 2,162,311

PROCESS FOR PRODUCING GRAPHITE WRITING AND DRAWING LEADS

Karl Kreutzer, Nuremberg, Germany, assignor to the firm J. S. Staedtler, Nuremberg, Germany No Drawing. Application January 25, 1937, Serial No. 122,322. In Germany July 7, 1936

3 Claims. (Cl. 106—5)

This invention relates to the production of graphite-clay leads, preferably those which when marked on tracing paper yield marks which are directly light printable.

According to Patent No. 1,989,370 the light opacity of lead marks is raised by adding a fat-soluble colouring body to the fat mass for preparing the burnt leads.

It has now been found that the same purpose can also be attained by mixing the burnt graphite-clay-lead with a non-colouring body which absorbs ultra-violet, and that these bodies, which may be colourless or coloured, are even better suitable since in the lead mark they do not leave behind any coloured traces, e. g. traces which become apparent on erasing, and moreover do not colour the paper when the marks are fixed by spraying over with a spirit-shellac solution.

While the applicability of the graphite-clay-leads prepared in the manner of the above patent with coloured fat mass was limited chiefly to the preparation of written matter and technical drawings capable of being light-printed, the invention enables the light opacity of graphite-clay-leads to be raised for every purpose of use.

For use in the sense of the invention numerous, non-colouring, colourless or coloured bodies are suitable which absorb in the long-wave ultra-violet spectral region e. g. the butyl and ethyl ether of oxyquinoline, derivatives of naphthol sulphonic acid, further triazoles, quinine sulphate, phenanthrene, and others, moreover the preparations hitherto used for other purposes: "Fluorol V" of the I. G. Farbenindustrie A. G., "WV 184", "WV 145", "J II 14 light protective substance" of the firm E. Merck, Darmstadt.

In carrying out the invention fat-soluble non-colouring ultra-violet absorbing bodies can be chosen and added to the fat mass, fatty acid, fatty alcohol and so forth serving for the preparation of the burnt graphite-clay-lead, the procedure being in essentially the same manner as in the case of the known use of fat-soluble colouring bodies, preferably in such a way that the additional substances are dissolved in a volatile organic solvent such as benzene, benzine, alcohol or the like and the burnt leads immersed in this solution, then dried and prepared with a fat mass which contains the same additional substances.

Example I.—The solution serving for the immersion of the burnt leads contains 5 parts of ethyl ether of oxyquinoline in 100 parts of ethyl alcohol. The fat mass serving for preparing the lead preliminarily dipped in this solution contains 10 parts of the ethyl ether of oxyquiniline in 100 parts of fat, e. g. tallow oil.

Example II.—The solution serving for the immersion of the burnt leads contains 1 part of 4-methylumbelliferon (3-umbelliferon) in 100 parts of ethyl alcohol. The fat mass serving for the preparation of the lead preliminarily dipped in this solution contains 1,5 parts 4-methylumbelliferon in 100 parts of wax e. g. ceryl alcohol or mycricyl alcohol.

As further experiments have shown the non-colouring, ultra-violet absorbing, colourless or coloured bodies may also be so chosen that a preparing of the burnt graphite-clay-lead with fat mass can be dispensed with. In this case such bodies are used which at the same time have the property of imparting to the lead the same sliding capability which heretofore is brought about by preparing with fat.

For example the procedure is as follows:

The burnt graphite-clay-leads are laid in fused ethyl ether of oxyquinoline and left lying therein for three hours. The fusion point of the oxyquinoline lies at about 40° C. Corresponding to their porosity, the leads absorb this substance. After being taken out of the melt and allowed to cool the leads are ready for writing purposes.

For this manner of preparation only those substances are suitable which, on the basis of their physical properties, also impart necessary sliding capability to the lead in addition to higher light opacity. It is not absolutely necessary to use only such substances which are made liquid by melting, on the contrary liquid light-absorbing substances may also be used.

By "non-coloring" substance is meant a substance which may have its own color, or be uncolored, but which is not a dyestuff and will not give up color to other substances.

Having now particularly described and ascertained the nature of my invention and in what manner the same is to be performed, I declare that what I claim is:

1. A process of making graphite writing and drawing leads comprising adding ethyl ether of oxyquinoline to the graphite-clay lead.

2. A process of making graphite writing and drawing leads comprising adding ethyl ether of oxyquinoline to graphite-clay lead containing a fat.

3. A graphite-clay writing and drawing lead containing ethyl ether of oxyquinoline.

KARL KREUTZER.